United States Patent
Benito

(10) Patent No.: US 8,096,917 B2
(45) Date of Patent: Jan. 17, 2012

(54) PLANETARY GEARBOX HAVING MULTIPLE SUN PINIONS

(75) Inventor: Pedro L. Benito, Rheine (DE)

(73) Assignee: General Electric Company, Schenectady, NY (US)

( * ) Notice: Subject to any disclaimer, the term of this patent is extended or adjusted under 35 U.S.C. 154(b) by 623 days.

(21) Appl. No.: 12/270,059

(22) Filed: Nov. 13, 2008

(65) Prior Publication Data

US 2010/0120573 A1    May 13, 2010

(51) Int. Cl.
*F16H 57/08* (2006.01)

(52) U.S. Cl. .......................... 475/331; 475/339; 475/151

(58) Field of Classification Search ...... 475/5, 149–151, 475/331, 332, 339–342, 345, 347; 290/40 B, 290/40 C, 44, 55
See application file for complete search history.

(56) References Cited

U.S. PATENT DOCUMENTS

| | | | |
|---|---|---|---|
| 3,401,580 A | 9/1968 | Sigg | |
| 6,176,804 B1 | 1/2001 | Kekki et al. | |
| 6,420,808 B1 | 7/2002 | Hosle | |
| 6,459,165 B1 * | 10/2002 | Schoo | 290/1 C |
| 6,607,464 B1 | 8/2003 | Bauer et al. | |
| 6,790,156 B2 | 9/2004 | Hosle | |
| 7,001,296 B2 * | 2/2006 | Yamauchi et al. | 475/5 |
| 7,008,348 B2 | 3/2006 | LaBath | |
| 7,678,004 B2 * | 3/2010 | Yamanaka et al. | 475/30 |
| 2005/0224262 A1 * | 10/2005 | Ima et al. | 180/53.6 |
| 2005/0280264 A1 | 12/2005 | Nagy | |
| 2006/0135312 A1 * | 6/2006 | Shiina et al. | 475/339 |
| 2006/0293143 A1 * | 12/2006 | Cho | 475/339 |
| 2008/0194378 A1 * | 8/2008 | Fox | 475/347 |

FOREIGN PATENT DOCUMENTS

| | | |
|---|---|---|
| EP | 1450040 A1 | 8/2004 |
| GB | 1299007 A | 12/1972 |

* cited by examiner

*Primary Examiner* — David D Le
*Assistant Examiner* — Huan Le
(74) *Attorney, Agent, or Firm* — James W. Pemrick; Ernest G. Cusick; Frank A. Landgraff

(57) ABSTRACT

A gearbox is provided having multiple sun gears and one or more planet stages. The planet stages can include a first planet stage and a second planet stage. A first sun gear is connected to the first planet stage, and a second sun gear is connected to the second planet stage. The torque transmitted from the planet stages is at least partially distributed among the first sun gear and the second sun gear.

7 Claims, 5 Drawing Sheets

PLANETARY GEARBOX HAVING MULTIPLE SUN PINIONS

BACKGROUND OF THE INVENTION

The present invention relates to a wind turbine and, in particular, to a gearbox interposed between a rotor of a wind turbine and an electrical generator.

It is known to use a planetary gearbox to drive an electric generator in response to rotation of a rotor of a wind turbine. The rotor provides a low speed, high torque input to the gearbox. The gearbox provides a high speed, low torque output to the generator. This type of gearbox has been used in this application for many years. It is also known that the planet and sun gears of such a gear box, and the bearings associated therewith, are subjected to high torque loads and thus suffer from high rates of wear and failure under such demanding usage.

BRIEF SUMMARY OF THE INVENTION

According to one aspect of the present invention, a gearbox is provided having multiple sun gears and one or more planet stages. The planet stages can include a first planet stage and a second planet stage. A first sun gear is connected to the first planet stage, and a second sun gear is connected to the second planet stage. The torque transmitted from the planet stages is at least partially distributed among the first sun gear and the second sun gear.

According to another aspect of the present invention, a gearbox for a wind turbine is provided having at least one turbine blade and an electrical power generator for converting low-speed, high-torque rotary power from the turbine blade (s) to high-speed, low-torque rotary power for electrical power generation. The gearbox includes a ring gear, a planet carrier mounted for rotation about a generally central axis within the ring gear and is adapted to be driven at a first end thereof by the turbine blade(s). A plurality of planet pinions are at spaced locations on the planet carrier around the central axis, with the axes of the planet pinions extending generally parallel to the central axis of the planet carrier. A planet gear is located on each of the planet pinions, and a plurality of sun gears rotate about the central axis and are engageable by the planet gears. Substantially all of the rotary power from the turbine blade(s) is transmitted through the planet pinions, and the rotary power is substantially distributed among the plurality of sun gears.

DETAILED DESCRIPTION OF THE INVENTION

Figure 1:
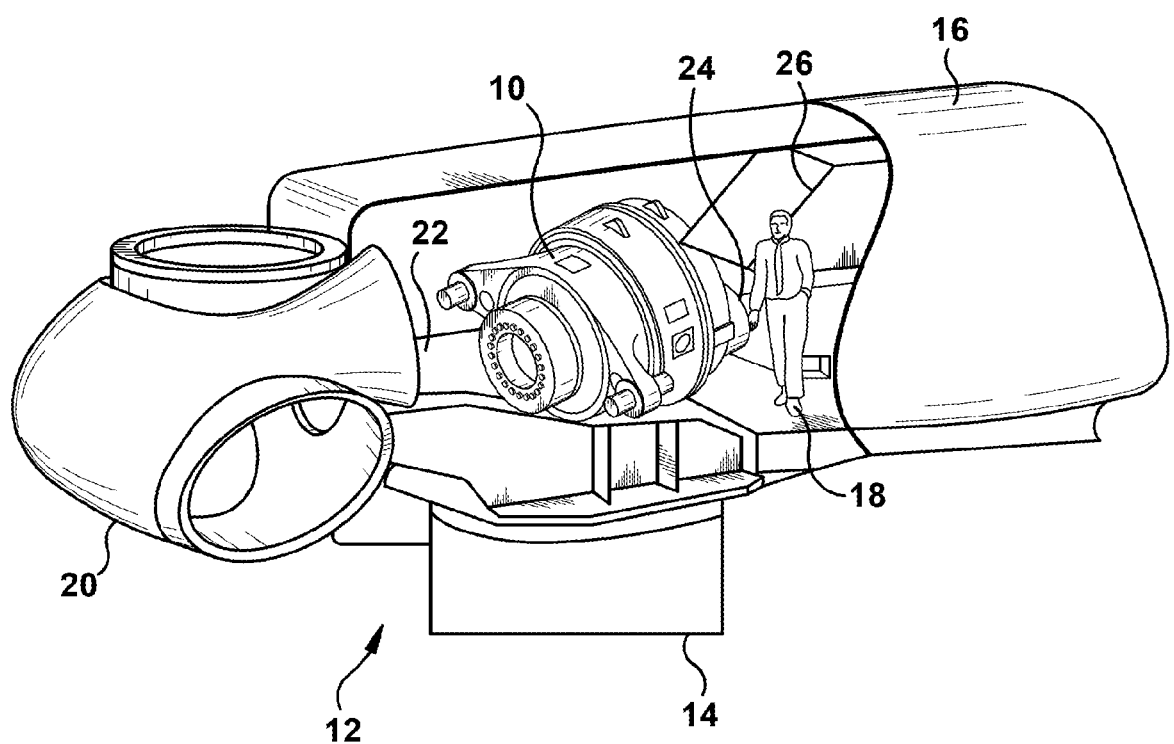
FIG. 1 is a partial cut-away illustration of a wind turbine that includes a known gearbox.

FIG. 1 illustrates a portion of one known wind turbine 12 having a gearbox 10. The gearbox 10 is typically housed within nacelle 16. The wind turbine 12 includes a support post or tower 14. The tower 14 supports nacelle 16. The gearbox 10 is supported in the nacelle 16. The size of the gearbox 10 is indicated schematically by the silhouette 18 of the person standing inside the wind nacelle 16.

A rotor 20 is supported on the nacelle 16 for rotation relative to the nacelle. The rotor 20 is connected by a rotor shaft 22 to the input end of the gearbox 10. The output end of the gearbox 10 is connected by an output shaft 24 to a generator 26.

The rotor 20 rotates in response to air movement past the wind turbine 12. The rotational force of the rotor 20 is transmitted through the rotor shaft 22, the gearbox 10, and the output shaft 24, to the generator 26. The generator 26 generates electricity.

Figure 2:
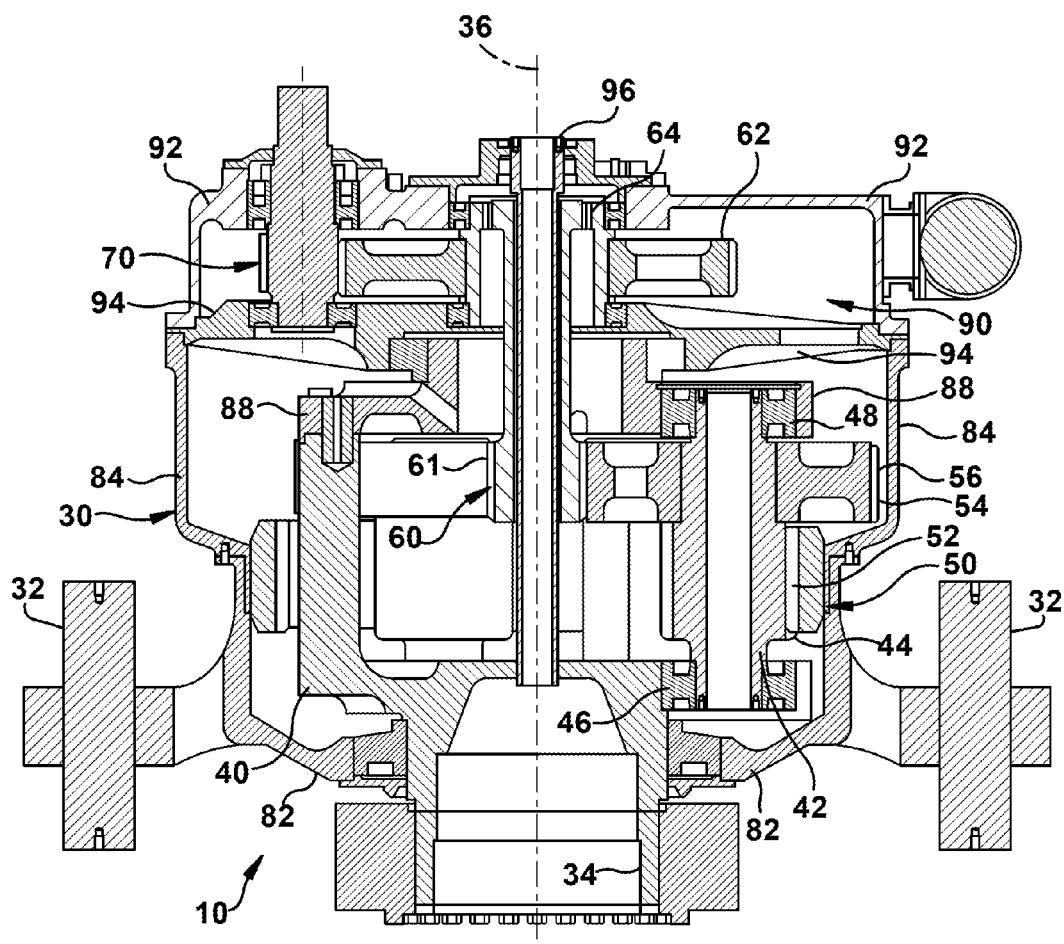
FIG. 2 is a cross-sectional illustration of the known gearbox of FIG. 1.

FIG. 2 illustrates a cross-sectional view of one known gearbox 10. The gearbox 10 includes a gearbox housing 30, which includes an input end cover 82, a planet gear cover 84, and a final stage cover 92. The gearbox housing 30 is supported on the nacelle 16 by support pins 32.

The input end cover 82 of the gearbox housing 30 extends around and supports a planet carrier 40, for rotation of the planet carrier 40 relative to the housing 30 about a central axis 36 of the planet carrier 40. An input hub 34 on a first end of the planet carrier 40 is coupled to the rotor shaft 22, in a suitable manner, not shown, for rotation with the rotor 20. The input hub 34 receives rotational force from the rotor 20 and rotates the planet carrier 40 relative to the gearbox housing 30 in response to that rotational force. The second end of the planet carrier 40, as illustrated, is substantially open, with a detachably mounted end plate 88 attached to the second end of the planet carrier 40. This removable carrier end plate 88 acts as a planet bearing support, as explained below.

The planet carrier 40 supports a plurality of planet pinions 42 therein for orbital movement about the central axis 36. In the illustrated embodiment, three planet pinions 42 are provided, spaced apart equally about the central axis 36. Bearings support the planet pinions 42 for rotation relative to the planet carrier. Specifically, a first planet bearing 46, mounted at the first end of the planet carrier 40, engages and supports a first end of each planet pinion 42, supporting that end of the planet pinion 42 directly from the planet carrier 40. A second planet bearing 48, which is mounted on the planet carrier end plate 88, engages and supports a second end of each planet pinion 42, thereby supporting the second end of the planet pinion 42 indirectly from the planet carrier 40. Each one of the planet pinions 42 has a plurality of external gear teeth 44 which, in the illustrated embodiment, are spur gear teeth.

The gearbox 10 includes a ring gear 50. The ring gear 50 is substantially fixed relative to the interior of the gearbox housing 30. That is, the ring gear 50 has external splines that mate with splines on the interior of the housing 30, preventing the ring gear 50 from rotating relative to the housing 30. The ring gear 50 basically floats relative to the housing 30, in that it can move radially a slight amount, within the clearance between the external splines on the ring gear 50 and the internal splines on the housing 30. The planet pinions 42 are substantially smaller in diameter than the ring gear 50.

The ring gear 50 has an array of internal spur or helical gear teeth 52. The internal gear teeth 52 on the ring gear 50 are in meshing engagement with the external gear teeth 44 on the planet pinions 42. As a result, orbital movement of the planet pinions 42 about the central axis 36, in response to rotation of the input hub 34 and the planet carrier 40 about the central axis, causes the planet pinions 42 to rotate about their own axes relative to the planet carrier 40. The rotational force transmitted from the rotor 20 to the input hub 34 is thus transmitted entirely to the planet pinions 42 to drive the planet pinions 42 to rotate about their own axes.

The gearbox 10 includes a plurality of planet gears 54. The number of planet gears 54 is equal to the number of planet pinions 42. In the illustrated embodiment, therefore, three planet gears 54 are provided.

Each of the planet gears 54 is fixed to one of the planet pinions 42 for rotation with its associated planet pinion 42. Thus, the gearbox 10 is a "compound" planetary gearbox. When the input hub 34 and the planet carrier 40 rotate, therefore, the rotational force of the input hub 34 is entirely transmitted through the planet pinions 42 to the planet gears 54 to drive the planet gears to rotate about the planet pinion axes.

The planet gears 54 are substantially larger in diameter than the planet pinions 42. Each one of the planet gears 54 has a plurality of external gear teeth 56 which, in the illustrated embodiment, are spur gear teeth.

The gearbox 10 also includes a single sun gear 60 mounted within the planet carrier 40, surrounded by the planet pinions 42. The sun gear 60 is radially supported by contact with the surrounding planet gears 54, for rotation of the sun gear 60 relative to the gear box housing 30 about the central axis 36. The sun gear 60 has a hollow bore along its axis, and along the axis of its shaft extension. A hollow tube 96, fixed to the final stage cover 92 on the gearbox housing 30, passes through the bore of the sun gear 60 and its shaft extension, substantially along the axis 36, to conduct control wiring (not shown) through the gear box 10 to the rotor 20. The sun gear 60 rotates relative to, but does not contact, the hollow tube 96. The sun gear 60 is substantially smaller in diameter than the planet gears 54.

The sun gear 60 has a plurality of external spur or helical gear teeth 61 that are in meshing engagement with the external gear teeth 56 on the planet gears 54. As a result, rotation of the planet gears 54 about their axes, in response to rotation of the input hub 34 and the planet pinions 42, causes the sun gear 60 to rotate about the central axis 36. The rotational force of the input hub 34 and the planet carrier 40 is thus entirely transmitted through the planet gears 54 to the sun gear 60, driving the sun gear for rotation about the central axis 36.

The gearbox 10 also includes a final stage 90, including a final stage end plate 94, the final stage cover 92, an output pinion 70, and an optional final stage gear 62. The final stage gear 62 is rotated with the sun gear 60, about the central axis 36, by a splined connection 64 at the end of the shaft extension of the sun gear 60. The splined end of the shaft extension of the sun gear 60 floats within the clearance in this splined connection to the final stage gear 62. Rotation of the output pinion 70 drives the generator 26 thereby producing electrical energy. The final stage 90 is optional, and many gearboxes use the sun gear as an input to the generator 26.

Input torque from the rotor 20 and the input hub 34 is split among the three planet pinions 42 and thus among the three planet gears 54, for transmission to the sun gear 60. This configuration spreads the high torque provided by the rotating input hub 34 among the planets. However, the sun gear 60 is the one point in the gear train in which all the torque is concentrated. This known gear train arrangement can affect the durability and reliability of the gear train, and specifically the sun gear 60.

Figure 3:
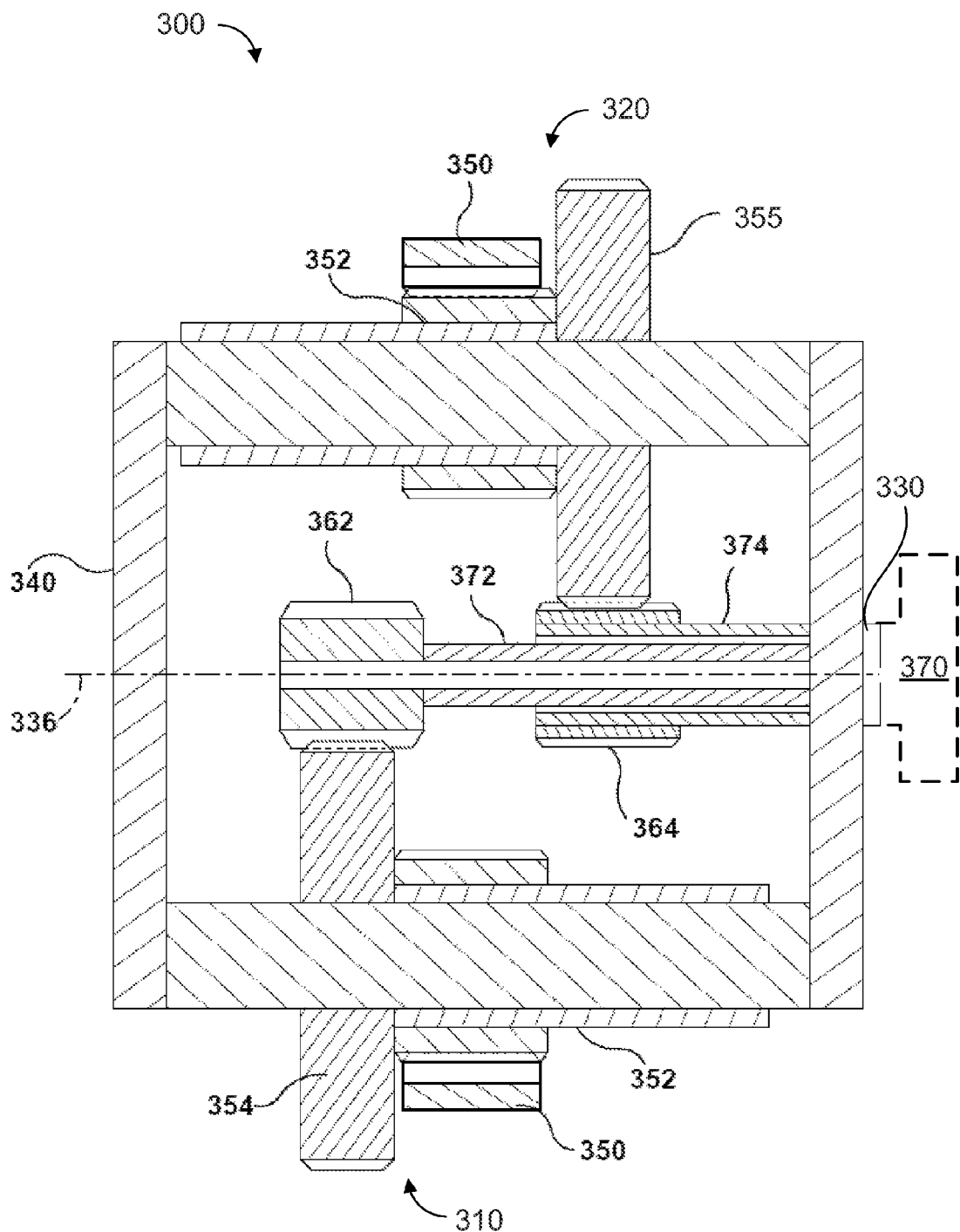
FIG. 3 is a cross-sectional illustration of a gearbox having multiple sun gears, according to one aspect of the present invention.

FIG. 3 illustrates a simplified cross-sectional illustration of an improved gearbox 300 according to one embodiment of the present invention. A main improvement is the addition of two sun gears 362 and 364, which in this embodiment can be coaxially aligned.

The planet carrier 340 supports a plurality of planet pinions 352 and planet gears 354 therein for orbital movement about the central axis 336. In one embodiment, the gearbox can comprise two stages 310, 320 of planet gears, with a first planet stage 310 (e.g., three planet gears 354) driving the first sun gear 362 and a second planet stage 320 (e.g., three planet gears 355) driving the second sun gear 364. For example, in the embodiment illustrated in FIG. 3, the gearbox 300 comprises two stages of planet gears, where each planet stage includes three planet gears. However, it is to be understood that two or more stages could be incorporated, with each stage having two or more planet gears. In some embodiments, each planet stage may have a different number of planet gears than other planet stages.

One major benefit of the gearbox 300 of FIG. 3 is that the torque transferred by the planet stages is split among the two sun gears. Each sun gear can drive a separate generator via a respective sun pinion or output shaft, a separate output stage, or both sun gears can be combined at the output to drive a single generator 370 or single output stage. As one example, the multiple sun pinions can be reunited or coupled to drive a single generator 370 via a stiffness matching coupling 330 or an elastic joint coupling 330.

In one embodiment the sun gear 362 drives first sun pinion or output shaft 372, and the second sun gear 364 drives a second sun pinion or output shaft 374. The first shaft 372 could be connected to a first generator (not shown) and the second output shaft could be connected to a second generator (not shown), where the first and second generator could be coaxially arranged.

Figure 4:
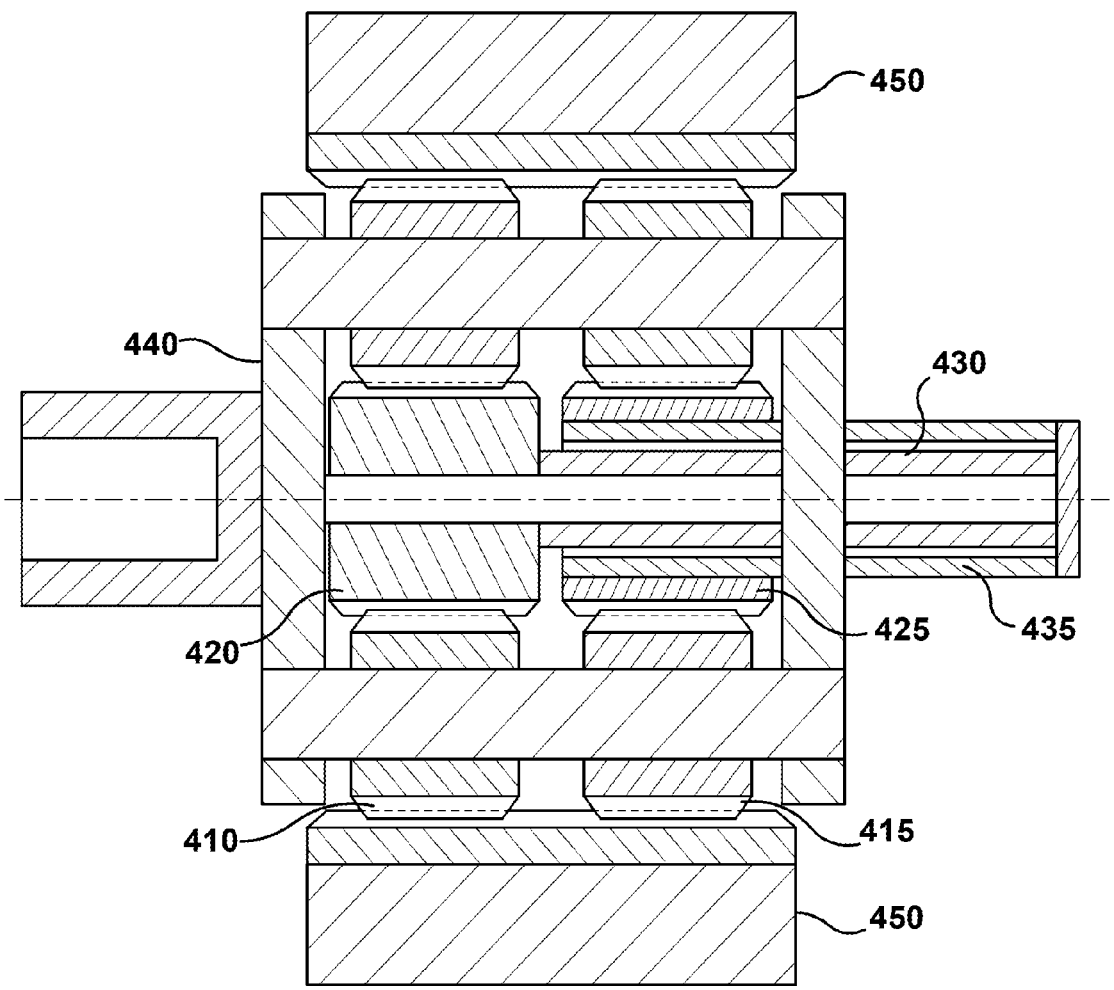
FIG. 4 is a cross-sectional illustration of a gearbox having multiple sun gears, according to another aspect of the present invention.

FIG. 4 illustrates another embodiment of the present invention, and shows a non-compound gearbox configuration. The gearbox comprises planet carrier 440, which drives two stages of planet gears. A first group of planet gears 410 drive a first sun gear 420, and the sun gear 420 is connected to a first sun pinion or output shaft 430. A second group of planet gears 415 drive a second sun gear 425, and the sun gear 425 is connected to a second sun pinion or output shaft 435. It is to be understood that the first and second groups of planet gears can each comprise two or more planet gears.

Each sun gear can drive a separate generator via a respective sun pinion or both sun pinions can be combined or coupled at the output to drive a single generator or single output stage. As one example, the multiple sun pinions can be reunited to drive a single generator via a stiffness matching coupling or an elastic joint coupling.

Figure 5:
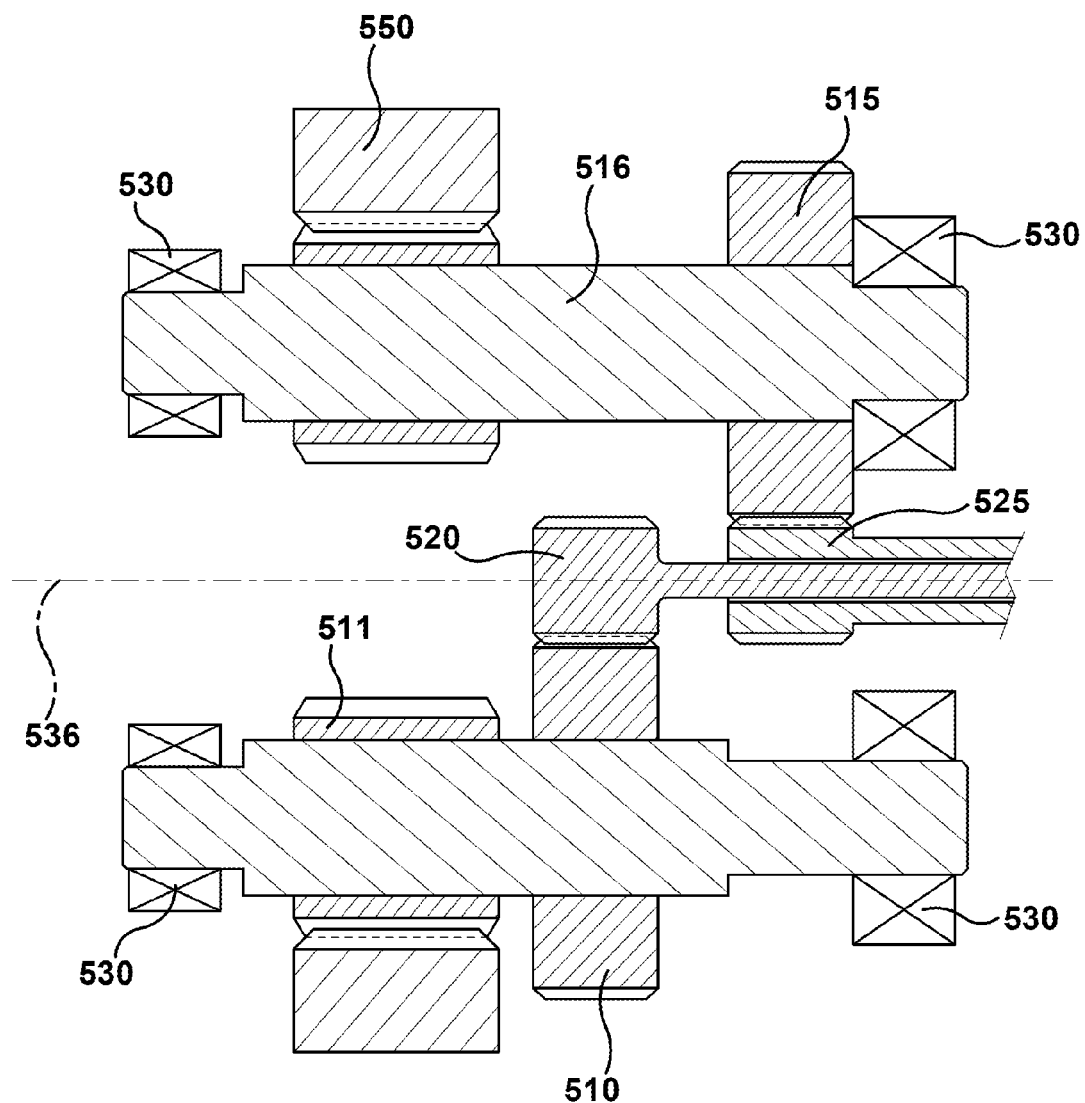
FIG. 5 is a cross-sectional illustration of a gearbox having multiple sun gears, according to yet another aspect of the present invention.

FIG. 5 illustrates a compound arrangement, according to another embodiment of the present invention. In the illustrated embodiment, a first planet stage comprises three planet pinions 511 and a second planet stage comprises three planet pinions 516. Bearings 530 support the planet pinions 511 and 516 for rotation relative to the planet carrier (not shown).

Ring gear 550 can be substantially fixed relative to the interior of the gearbox housing (not shown). That is, the ring gear 50 has external splines that mate with splines on the interior of the housing, preventing the ring gear 50 from rotating relative to the housing. The planet pinions 511 and 516 are substantially smaller in diameter than the ring gear 550.

The ring gear 550 can have an array of internal spur or helical gear teeth. The internal gear teeth on the ring gear 550 are in meshing engagement with the external gear teeth on the planet pinions 511 and 516. As a result, orbital movement of the planet pinions about the central axis 536, in response to rotation of the input hub and the planet carrier about the central axis, causes the planet pinions to rotate about their own axes relative to the planet carrier. The rotational force transmitted from the rotor to the input hub is thus transmitted entirely to the planet pinions to drive the planet pinions to rotate about their own axes.

The gearbox includes a two stages of planet gears. A first stage is comprised of planet gears 510 and a second stage is comprised of planet gears 515. The number of planet gears is equal to the number of planet pinions, and in the illustrated embodiment, therefore, three planet gears are provided in each planet stage. However, it is to be understood that each planet stage can comprise two or more planet gears.

The gearbox includes two sun gears, a first sun gear 520 and a second sun gear 525. The first sun gear 520 is radially supported by contact with the surrounding first stage planet gears 510, for rotation of the first sun gear 520 relative to the gear box housing about the central axis 536. The second sun gear 525 is radially supported by contact with the surrounding second stage planet gears 515, for rotation of the second sun gear 525 relative to the gear box housing about the central axis 536. The sun gears are substantially smaller in diameter than the planet gears.

The sun gears can have a plurality of external spur or helical gear teeth that are in meshing engagement with the external gear teeth on the planet gears. As a result, rotation of the planet gears about their axes, in response to rotation of the input hub and the planet pinions, cause the sun gears to rotate about the central axis 536. The rotational force of the input hub and the planet carrier is thus entirely transmitted through the planet gears, and this torque is split between the two sun gears 520 and 525.

In all the above embodiments, two or more sun gears can be incorporated to distribute the total torque. For example, three or four sun gears could be used with a similar number of planet stages. The output shafts of the individual sun gears can be routed to separate generators or may be reunited as a single output into one generator. Coaxial generators can be used with coaxial sun shafts, or the individual sun shafts may be paired with multiple output stages to drive non-coaxial generators.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A gearbox having multiple sun gears, comprising:
   one or more planet stages, said one or more planet stages comprising a first planet stage and a second planet stage;
   a first sun gear, connected to said first planet stage;
   a first sun output shaft coupled to the first sun gear;
   a second sun gear, connected to said second planet stage;
   a second sun output shaft coupled to the second sun gear;
   the first sun output shaft coupled to the second sun output shaft via, at least one of, a stiffness matching coupling and an elastic joint coupling; and
   wherein, torque transmitted from said one or more planet stages is at least partially distributed among said first sun gear and said second sun gear, the first sun output shaft and the second sun output shaft are arranged coaxially to each other, and the first sun output the second sun output shaft are coupled to drive only one single generator.

2. The gearbox of claim 1, further comprising:
   a planet carrier connected to said one or more planet stages.

3. The gearbox of claim 1, wherein said gearbox is configured as one of the following:
   a non-compound, compound and compound-planetary type gearbox.

4. The gearbox of claim 1, wherein said gearbox is used in a wind turbine.

5. A gearbox for a wind turbine having at least one blade and an electrical power generator for converting low-speed, high-torque rotary power from the at least one blade to high-speed, low-torque rotary power for electrical power generation, the gearbox comprising:
   a ring gear;
   a planet carrier mounted for rotation about a generally central axis within said ring gear and adapted to be driven at a first end thereof by said at least one blade;
   a plurality of planet pinions at spaced locations on said planet carrier around said central axis, with the axes of said planet pinions extending generally parallel to said central axis of said planet carrier;
   a planet gear on each said planet pinions;
   a plurality of sun gears rotatable about said central axis and engageable by said planet gears, the plurality of sun gears comprising a first sun gear having a first sun output shaft coupled thereto, and a second sun gear having a second sun output shaft coupled thereto, the first sun output shaft arranged coaxially with the second sun output shaft, the first sun output shaft coupled to the second sun output shaft via, at least one of, a stiffness matching coupling and an elastic joint coupling; and
   wherein, substantially all of the rotary power from said at least one blade is transmitted through said plurality of planet pinions, and said rotary power is substantially distributed among said plurality of sun gears, and wherein the first sun output shaft and the second sun output shaft are coupled to drive only one single generator.

6. The gearbox of claim 5, wherein said planet carrier is connected to one or more planet stages.

7. The gearbox of claim 5, wherein said gearbox is configured as one of the following:
   a non-compound, compound and compound-planetary type gearbox.

\* \* \* \* \*